Aug. 8, 1967        R. W. FORWARD        3,334,410
COMBINATION MOLD AND FASTENING MEANS
Filed Feb. 23, 1965        3 Sheets-Sheet 1
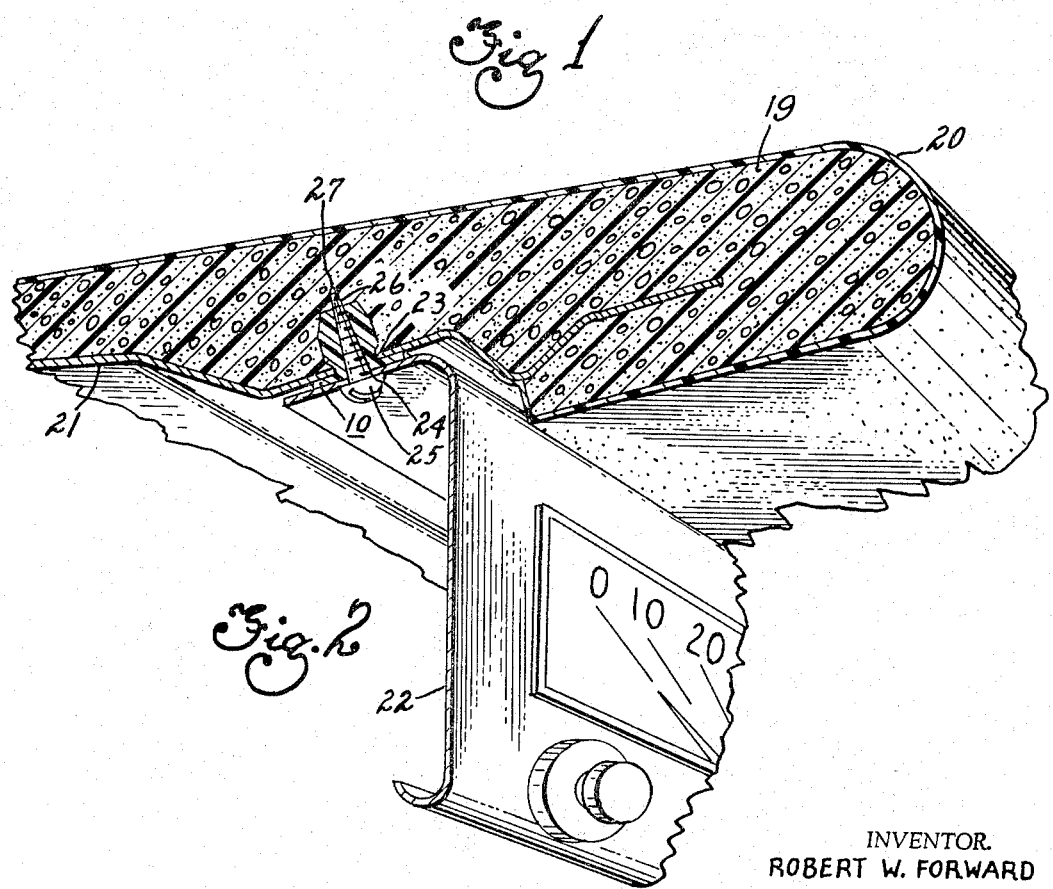
INVENTOR.
ROBERT W. FORWARD
BY
HIS ATTORNEY Aug. 8, 1967     R. W. FORWARD     3,334,410

COMBINATION MOLD AND FASTENING MEANS

Filed Feb. 23, 1965     3 Sheets-Sheet 2

INVENTOR
ROBERT W. FORWARD
BY
Albert H. Reuther
HIS ATTORNEY

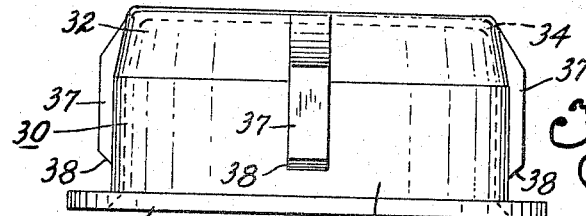
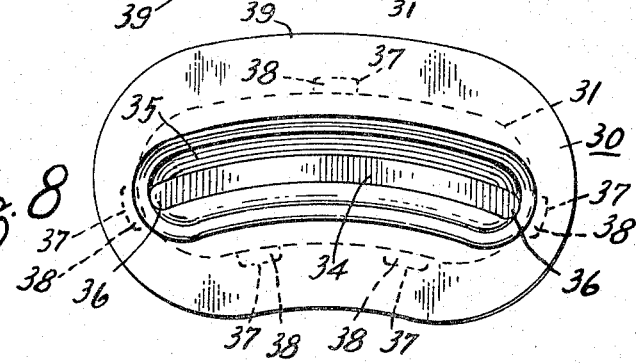
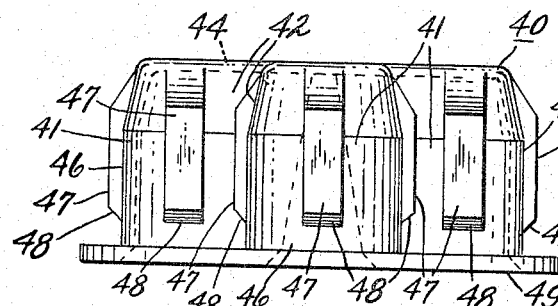
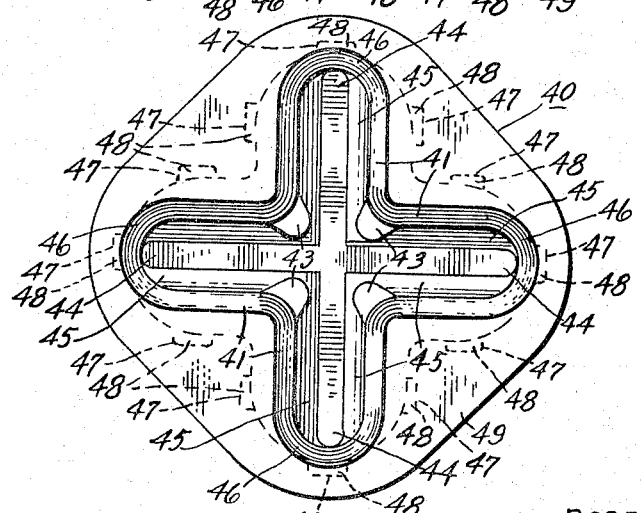

United States Patent Office 3,334,410
Patented Aug. 8, 1967

3,334,410
COMBINATION MOLD AND FASTENING MEANS
Robert W. Forward, Centerville, Ohio, assignor to General Motors Corporation, Detroit, Mich., a corporation of Delaware
Filed Feb. 23, 1965, Ser. No. 434,299
1 Claim. (Cl. 29—453)

This invention relates to assembly of vehicle components and, more particularly, to alignment and fastening of relatively rigid parts one of which includes a foamed polymer covering thereon.

Considerable time and labor is lost in attempting to find an opening hidden by a foamed polymer covering such as on a vehicle dashboard panel. An operator seeks to fasten a pair of relatively rigid parts which at times even have predetermined misalignment due to manufacturing tolerances and other causes such that the foamed covering hides the openings and complicates the operator's task of finding the opening on the foamed part, adding a fastening clip, and then fastening the parts to each other.

An object of the present invention is to provide a solution to the problem of fastening together parts regardless of foam means on at least one thereof and regardless of misalignment with a minimum of labor and parts.

Another object of this invention is to provide assembly of relatively rigid parts to each other expediently though one of the parts has a foamed polymer covering thereof which is used to advantage to seal around a plug means or elongated fastener for lateral variance in alignment and for resilience to hold tight with a friction lock to a fastener projecting therein.

Another object of this invention is to provide a combination mold plug-fastener having an elongated cup-like body portion and laterally extending flange along edging thereof as well as opposite cam locking portions to engage periphery of an opening of a mounting panel against one side of which a foamed polymer covering is added to seal against the body portion which remains in place to receive self-centering screw-type fastening thereto even accommodating longitudinal adjustment between inaccurately spaced opening distance of adjacent openings.

A further object of this invention is to provide in combination a pair of mounting parts one of which is a dashboard member carrying a foamed polymer covering thereon which seals directly against an elongated plastic cup-like plug-fastener means both for closing a mounting aperture during foam-molding and for receiving a screw-prong-type fastener that holds the parts together with latitude where mounting apertures fail to line up sideways.

Another object of this invention is to provide a procedure for first snap-fitting a combination plastic plug-fastener means having an elongated body portion into a corresponding mounting panel aperture, adding polymer foam covering directly to one side of the panel thereby to seal against the combination plug-fastener means, locating further paneling adjacent to the foam-covered panel with the elongated plastic body portion exposed on a side opposite to the foam covering, and installing a screw-prong-type fastener through the adjacent panels and into locking engagement with the elongated plastic body portion regardless of inaccuracy in location between aperturing in one direction transverse to the axis between panel aperturing.

Further objects and advantages of the present invention will be apparent from the following description, reference being had to the accompanying drawings wherein preferred embodiments of the present invention are clearly shown.

In the drawings:

FIGURE 1 is representative of assembly procedural steps in accordance with the present invention.

FIGURE 2 illustrates fragmentary portions of adjacent apertured panels one of which has polymer foam covering and combination plug-fastener means readily engageable by screw-prong-type fasteners despite inaccuracy between apertures of adjacent panels.

FIGURES 7 and 8 as well as FIGURES 9 and 10 are side and plan views respectively of two additional embodiments of combination plug-fastening means.

During manufacture of vehicle instrument and dashboard assembly such as illustrated for example by disclosures of Patents 3,042,137, Mathues et al. issued July 3, 1962, and 3,088,539, Mathues et al. issued May 7, 1963, there can be provided a flange portion of a metal insert means having a polymer foam material on one side thereof of in a location where an aperture or slot is provided for mounting purposes. Previously, it has been practiced to attempt to cover such apertures or slots with a removable shielding having a "jelly-cup" configuration subject to subsequent insertion of a metal clip through an adjacent slot or opening. Such a metal clip must be handled separately and considerable effort is required to insert such a clip through an adjoining slot or opening and yet retain or obtain proper alignment of the clip per se as to the aperture or slot through which mounting means for fastening are to be installed. During mass production operations a time factor is important and tedious trial and error alignment of such a separable metal clip as well as the shielding prior to any such attempted clip insulation can result in considerable expenditure of time and energy. Furthermore, it is frequently found that the shielding for the aperturing and openings or slots is inaccurately placed and ineffective to keep the foam polymer material from escaping through the openings in the metal insert thus providing a messy leakage which further complicates the problem of installing the separable metal clip means properly in alignment.

Figure 6:
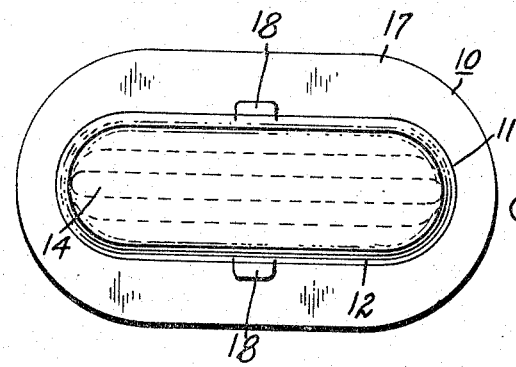
FIGURE 6 is a plan view of the combination plug-fastening means taken in direction of arrow 6 in FIGURE 4.
Figure 4:
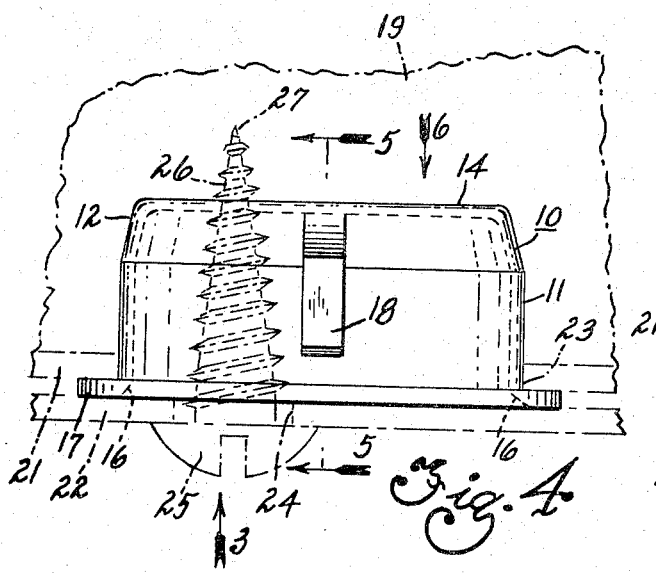
FIGURE 4 is a side view of combination plug-fastening means of FIGURE 3.
Figure 5:
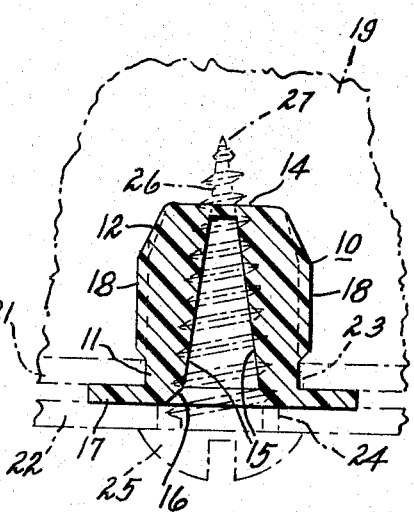
FIGURE 5 is a cross-sectional view taken along line 5—5 in FIGURE 4.
Figure 3:
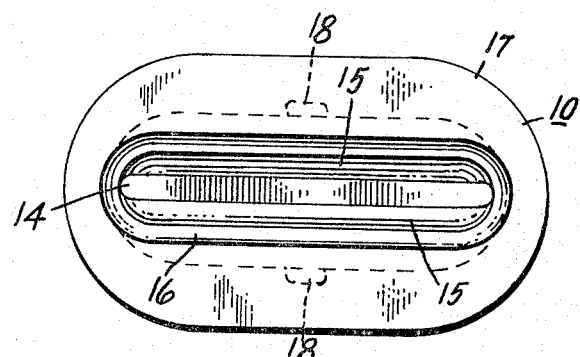
FIGURE 3 is a plan view of the combination plug-fastening means for use in accordance with the present invention and taken in direction of arrow 3 in FIGURE 4.

Assembly procedure in accordance with the present invention as represented in a view of FIGURE 1 can provide a combination of features to result in an improved end product and greatly facilitated mass production operations. FIGURE 1 provides a chart in which predetermined procedural steps are listed. The procedural steps involve use of a combination plastic plug-fastener means generally indicated by numeral 10 in views of FIGURES 2 through 6 inclusive in the drawings. This combination plug-fastener means has an elongated main body portion 11 which has an inwardly tapered siding 12 peripherally around a thinned bottom or base 14 best seen in views of FIGURES 4 and 5. Internal surfacing of the main body portion 11 has comparable oppositely tapered inner walls 15. A further generally oblong-shaped guide taper portion 16 is provided laterally inwardly from an outwardly extending flange portion 17 integral with the main body portion 11 and having a corresponding oblong or elongated shape. This oblong or elongated shape results from having the opposite walls with surfacing 15 considerably longer than the width of the cavity or opening accessible by way of the tapered surfacing 16. The plastic material from which the combination plug-fastener means is made can be a suitable polyamide, acetal resin and the like with sufficient resilience to permit snap-fitting thereof into a panel aperture or elongated slot substantially complementary to the body portion 11. To assure anchoring of the body portion 11 the opposite longer sidewalls along an exterior thereof on the body portion 11 have opposite cam locking portions 18. The body portion 11 of the combination plastic plug-fastener means serves to seal off an opening through which insertion is made by having a foam covering 19 indicated in views of FIGURES 2 and 5 in a surrounding relationship to the body portion relative to a dashboard insulation covering 20 such as vinyl and the like as well as a first dashboard panel means 21 and a second body mounting panel means 22 for the dashboard assembly. The first or dashboard panel portion 21 can have an elongated opening or slot 23 therethrough and a lower mounting panel 22 can have a corresponding elongated aperture or slot 24 therethrough. Due to manufacturing tolerances and other inaccuracies it frequently occurs that there is misalignment between such openings 23 and 24 at least in one direction represented by the greater length of the oblong configuration of the openings as well as the combination plastic plug-fastener means 10. The combination plastic plug-fastener means serves both to seal off the opening 23 during foaming of a crashpad covering directly onto one side of the dashboard panel 21 and also to assure clean access to an elongated space in which misalignment can be compensated for relative to a corresponding opening 24 in the panel 22. A fastening means including an enlarged head portion 25 and a tapered shank 26 has been outlined in views of FIGURES 2, 4 and 5 and it is to be noted that a sharp point or end 27 of such fastening means can pierce the base 14 of the combination plastic plug-fastener means either by threading or by barbed force fit thereto for establishing an interlock and mounting of the panels 21 and 22 adjacent to each other regardless of the presence of cured foam material 19. The combination plastic plug-fastener means serves to retain the foam in proper position which once cured will not escape or leak through any opening even when a fastening means is installed. The foam covering 19 can be provided with reinforcement as disclosed in Patents 3,042,137 and 3,088,539 noted earlier. The combination plastic plug-fastener means can remain in position as installed by snap-fitting. Considerable time and effort is eliminated by obviating need for any separate metal clip means to be installed with difficulty in an area where the foam 19 and first panel 21 intersect. Installing a screw-prong fastening means such as 25–26–27 can be accomplished readily through elongated slots or openings of adjacent panels accompanied by locking engagement of the fastening means with the elongated plastic body portion of the combination plug-fastener means. The elongated configuration of the combination plastic plug-fastener fastener means accommodates and compensates for possible misalignment without any blind searching through foamed material such as 19 in an attempt to find a pair of corresponding openings to fit together in limited access space where previously an additional metal clip had to be installed also. Use of a paper cup for shielding subject to placement and removal before using a "Tinnerman-type" spring clip member is also obviated.

The combination plug-fastener means 10 used in conjunction with elongated openings permits longitudinal adjustment between inaccurately spaced holes of adjoining panels. The foam material which can be made of any suitable composition such as polyurethane, isocyanate and the like actually aids in holding the plastic combination plug-fastener means in place. The combination plastic plug-fastener means 10 has sufficient resilience to hold tight with a friction lock as to the fastening device 25–26–27. The assembly procedure is greatly expedited and the plug or cup-like elongated fastening means provides latitude where the openings or holes fail to line up accurately in a sideways direction. The elongated body portion 11 of the plastic plug-fastener means 10 in effect provides a cavity of sufficient strength in the plastic foam material of the vehicle dashboard or crash pad and also eliminates need for any separate shielding cup of paper as well as the metal spring clip or so-called "J" nut used previously. A relatively long path along the bottom portion 14 of the combination plastic plug-fastener means can accommodate quite a difference of lateral misalignment though permitting accomplishment of a mating assembly of adjacent panels readily along a mass production assembly line.

FIGURES 7 and 8 illustrate another embodiment of combination plug-fastening means 30 substantially like that previously described but having a crescent or kidney shaped body portion 31 having inwardly tapered siding 32 peripherally around a thinned bottom or base 34. Internal surfacing of the main body portion 31 has comparable oppositely tapered inner walls 35. Opposite ends 36 of internally curved spacing of the crescent or kidney shaped body portion 31 are offset from spacing therebetween so that both lateral and limited radial offsets in alignment can be accommodated when a screw-prong fastening means installation is made as noted earlier. It is to be understood that the combination plug-fastening means of FIGURES 7 and 8 can fit complementary to a panel slot or opening stamped accordingly and outwardly projecting plural abutments or axially extending lugs 37 defining shoulders 38 to one side of crescent or kidney shaped flanging 39 integral with the body portion 31 can be provided for interlock snap fit in a sealing position as to the panel.

FIGURES 9 and 10 show still a further embodiment of combination plug-fastening means 40 having an X-shaped or crossed main body portion 41 with inwardly tapered siding 42. At a central internal intersection of the cavitation or spacing defined by the X-shaped or crossed main body portion there are cornering extensions 43 that assure engagement of screw-prong fastening means at dead center location free of wobble or looseness laterally though axially such fastening means noted previously can pierce through thinned bottom or base 44 centrally as well as in any of four diametrically opposite locations. Internal surfacing of the main body portion in each of the four directions has opposite tapered inner walls 45. Rounded corners or ends 46 are provided for termination of each of the directions of the X-shaped or crossed body portion structural formations and offsets transversely can be accommodated for fitting complementary panel openings and mating fastening means regardless of manufacturing tolerance ranges and/or inaccuracy of alignment resulting therefrom. Outwardly projecting plural abutments or axially extending lugs 47 define shoulders 48 to one side of a substantially squared laterally integral flanging 49 integral with the body portion 41.

The combination plug-fastening means of each embodiment as made of plastic material can block off foam material to prevent escape thereof through panel openings used for dashboard mounting door or sheet panels for example. Also such combination plug-fastening means can seal holes or openings where blind access with fasteners is to be encountered. Weather or water proofing seal of such holes or openings in panels can be achieved together with fastener installation regardless of slight misalignment that may be encountered.

While the embodiments of the present invention herein disclosed constitute preferred forms, it is to be understood that other forms might be adopted.

What is claimed is as follows:

A procedure including the steps of, snap-fitting a combination plastic plug-fastener means having a transversely elongated body portion slotted in the direction of elongation into each of a plurality of spaced mounting panel apertures, adding polymer foam covering directly to one side of the panel thereby to seal against the combination plug-fastener means, locating further panelling having apertures therein complementary to said mounting panel apertures adjacent to the side of said foam-covered panel opposite to the foam covering, and installing a fastener through each aperture of said adjacent panel and into locking engagement with the slotted body portion of the corresponding said combination plastic plug-fastener means.

References Cited

UNITED STATES PATENTS

| | | | |
|---|---|---|---|
| 2,741,324 | 4/1956 | Anderson | 180—90 |
| 3,042,137 | 7/1962 | Mathues | 180—90 |
| 3,088,539 | 5/1963 | Mathues | 180—90 |
| 3,110,337 | 11/1963 | Biesecker | 85—80 |
| 3,123,185 | 3/1964 | Van Der Rijst | 52—633 |
| 3,241,428 | 3/1966 | Fischer | 85—83 |

BENJAMIN HERSH, *Primary Examiner.*

J. H. BRANNEN, *Assistant Examiner.*